(12) United States Patent
Dancuart Kohler et al.

(10) Patent No.: US 7,150,831 B2
(45) Date of Patent: Dec. 19, 2006

(54) METHOD OF PURIFYING FISCHER-TROPSCH DERIVED WATER

(75) Inventors: Luis P. F. Dancuart Kohler, Vaalpark (ZA); Gert H. du Plessis, Secunda (ZA); Francois J. du Toit, Sasolburg (ZA); Edward L. Koper, Secunda (ZA); Trevor D. Phillips, Vanderbijlpark (ZA); Janette van der Walt, Vaalpark (ZA)

(73) Assignee: Sasol Technology (Pty) Ltd, Johannesburg (ZA)

( * ) Notice: Subject to any disclaimer, the term of this patent is extended or adjusted under 35 U.S.C. 154(b) by 187 days.

(21) Appl. No.: 11/014,517

(22) Filed: Dec. 16, 2004

(65) Prior Publication Data

US 2005/0131084 A1    Jun. 16, 2005

Related U.S. Application Data

(63) Continuation of application No. PCT/ZA03/00078, filed on Jun. 18, 2003.

(60) Provisional application No. 60/390,688, filed on Jun. 18, 2002.

(30) Foreign Application Priority Data

Jun. 18, 2002    (ZA)    ................................ 2002/04850

(51) Int. Cl.
    *C02F 3/00*    (2006.01)
(52) U.S. Cl. .................... 210/601; 210/615; 210/616; 210/617; 210/638; 210/641; 210/650; 210/652; 210/660
(58) Field of Classification Search ................ 210/601, 210/615–617
See application file for complete search history.

(56) References Cited

U.S. PATENT DOCUMENTS 2,683,158 A    7/1954    Brown et al.

(Continued)

FOREIGN PATENT DOCUMENTS

EP    0 838 435    4/1998

(Continued)

OTHER PUBLICATIONS

UK Search Report, GB 0314076.1, dated Nov. 21, 2003.

(Continued)

*Primary Examiner*—Chester T Barry
(74) *Attorney, Agent, or Firm*—TraskBritt

(57) ABSTRACT

A process for the production of purified water from Fischer-Tropsch reaction water wherein the purified water is an aqueous stream having a COD of between 20 and 500 mg/l, a pH of between 6.0 and 9.0, a suspended solids content of less than 250 mg/l and a total dissolved solids content of less than 600 mg/l, and wherein the process includes at least the steps of a primary treatment stage comprising an equilibrium staged separation process having at least one stage for removing at least a fraction of non-acid oxygenated hydrocarbons from the Fischer-Tropsch reaction water to produce a primary water enriched stream, a secondary treatment stage comprising liquid-liquid extraction for removing at least a fraction of organic acids from at least a portion of the primary water enriched stream to produce a secondary water enriched stream, a tertiary treatment stage comprising biological treatment for removing at least a fraction of acidic oxygenated hydrocarbons from at least a portion of the secondary water enriched stream to produce a tertiary water enriched stream and a quartic treatment stage comprising solid-liquid separation for removing at least some solids from at least a portion of the tertiary water enriched stream.

20 Claims, 1 Drawing Sheet

U.S. PATENT DOCUMENTS

| | | | |
|---|---|---|---|
| 4,746,434 A | 5/1988 | Grieves et al. |
| 4,948,511 A | 8/1990 | Swanson et al. |
| 5,429,942 A | 7/1995 | Kock et al. |
| 6,193,872 B1 | 2/2001 | Reason et al. |
| 6,225,358 B1 | 5/2001 | Kennedy |
| 6,462,097 B1 | 10/2002 | Martino et al. |

FOREIGN PATENT DOCUMENTS

| | | |
|---|---|---|
| GB | 2 023 120 | 12/1979 |
| WO | WO 93/12242 | 6/1993 |
| WO | WO 98/18726 | 5/1998 |
| WO | WO 03/048272 A1 | 6/2003 |
| WO | WO 03/106346 A1 | 12/2003 |
| WO | WO 03/106349 A1 | 12/2003 |
| WO | WO 03/106354 A1 | 12/2003 |

OTHER PUBLICATIONS

UK Examination Report, GB 0314076.1, dated Dec. 31, 2004.
Netherlands Search Report, NL 1023693, dated Jun. 18, 2003.
PCT International Search Report, PCT/ZA03/00078, dated Oct. 29, 2003.
PCT International Preliminary Examination Report, PCT/ZA03/00078, dated Oct. 29, 2004.
PCT Written Opinion, PCT/ZA03/00078.

METHOD OF PURIFYING FISCHER-TROPSCH DERIVED WATER

CROSS-REFERENCE TO RELATED APPLICATIONS

This application is a continuation of International Application No. PCT/ZA03/00078, filed Jun. 18, 2003 designating the United States, and published, in English, as PCT International Publication No. WO 03/106353 on Dec. 24, 2003, the contents of which are incorporated by this reference, which application claims priority to U.S. Provisional Patent Application Ser. No. 60/390,688 filed Jun. 18, 2002.

TECHNICAL FIELD

This invention relates to the purification of water produced during Fischer-Tropsch synthesis for which synthesis a variety of carbonaceous materials are used as feedstock.

BACKGROUND TO THE INVENTION

The inventors are aware of processes for the synthesis of water from a carbonaceous feedstock, such as natural gas and coal, which processes also produce hydrocarbons.

One such process is the Fischer-Tropsch process of which the largest product is water and, to a lesser extent, hydrocarbons including olefins, paraffins, waxes, and oxygenates. There are numerous references to this process such as, for example on pages 265 to 278 of "Technology of the Fischer-Tropsch process" by Mark Dry, Catal. Rev. Sci. Eng., Volume 23 (1&2), 1981.

The products from the Fischer-Tropsch process may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

In certain areas where carbonaceous feedstocks are to be found, water is in short supply and a relatively costly commodity. Also, environmental concerns prevent the disposal of polluted water derived from the Fischer-Tropsch process into natural water ways and the sea thereby presenting a case for the production and recovery of useable water at the source of the carbonaceous feedstocks.

The carbonaceous feedstocks typically include coal and natural gas that are converted to hydrocarbons, water and carbon dioxide during Fischer-Tropsch synthesis. Naturally, other carbonaceous feedstocks such as, for example, methane hydrates found in marine deposits, can also be used.

Before the water produced during the Fischer-Tropsch is purified in accordance with the present invention, it is typically subjected to preliminary separation aimed at isolating a water-enriched stream from the Fischer-Tropsch products.

The preliminary separation process includes condensing the gaseous product from the Fischer-Tropsch reactor and separating it in a typical three-phase separator. The three streams exiting the separator are: a tail gas, a hydrocarbon condensate including mainly hydrocarbons in the $C_5$ to $C_{20}$ range and a reaction water stream containing dissolved oxygenated hydrocarbons and suspended hydrocarbons.

The reaction water stream is then separated using a coalescer that separates the reaction water stream into a hydrocarbon suspension and a water-rich stream.

The coalescer is capable of removing hydrocarbons from the reaction water stream to a concentration of between 10 ppm and 1000 ppm, typically 50 ppm.

The water-enriched stream thus obtained forms the feedstock for the method according to the present invention and will be denoted in this specification by the term "Fischer-Tropsch reaction water."

The composition of the water-enriched stream or reaction water is largely dependent on the catalyst metal used in the Fischer-Tropsch reactor and the reaction conditions (e.g., temperature, pressure) employed. The Fischer-Tropsch reaction water can contain oxygenated hydrocarbons including aliphatic, aromatic and cyclic alcohols, aldehydes, ketones and acids, and to a lesser extent aliphatic, aromatic and cyclic hydrocarbons such as olefins and paraffins.

The Fischer-Tropsch reaction water may also contain small quantities of inorganic compounds including metals from the Fischer-Tropsch reactor, as well as nitrogen and sulphur-containing species that originate from the feedstock.

The influence of the type of Fischer-Tropsch synthesis used on the quality of Fischer-Tropsch reaction water is illustrated in typical organic analysis (Table 1) of Fischer-Tropsch reaction water generated from three different synthesis operating modes, namely:

| | | |
|---|---|---|
| Low Temperature Fischer-Tropsch | LTFT | Cobalt or Iron catalyst |
| High Temperature Fischer-Tropsch | HTFT | Iron catalyst |

TABLE 1

Typical Organic Composition of Fischer-Tropsch reaction water from Different Fischer-Tropsch Synthesis Operating Modes

| Component (mass %) | LTFT (Cobalt Catalyst) | LTFT (Iron Catalyst) | HTFT (Iron Catalyst) |
|---|---|---|---|
| Water | 98.89 | 95.70 | 94.11 |
| non-acid oxygenated hydrocarbons | 1.00 | 3.57 | 4.47 |
| Acidic oxygenated hydrocarbons | 0.09 | 0.71 | 1.40 |
| Other Hydrocarbons | 0.02 | 0.02 | 0.02 |
| Inorganic components | <0.005 | <0.005 | <0.005 |

It is evident from the typical analyses of Fischer-Tropsch reaction waters of different origin (Table 1) that these waters, in particular HT Fischer-Tropsch reaction water, contain relatively high concentrations of organic compounds, and direct application or disposal of these waters is generally not feasible without further treatment to remove undesirable constituents. The degree of treatment of the Fischer-Tropsch reaction water depends largely on the intended application, and it is possible to produce a wide range of water qualities ranging from boiler feed water to partially treated water which may be suitable for discharge to the environment.

It is also possible to co-treat Fischer-Tropsch reaction water with other typical process waste water as well as rain water.

SUMMARY OF THE INVENTION

The water purification processes described in this invention may, after making minor adaptations, also be used for the processing of aqueous streams derived from generic synthesis gas conversion processes using metallic catalysts similar to the catalysts used during Fischer-Tropsch synthesis.

According to a first aspect of the invention, there is provided a process for the production of purified water from Fischer-Tropsch reaction water, which process includes at least the steps of:
  (a) a primary treatment stage comprising an equilibrium staged separation process having at least one stage for removing at least a fraction of non-acid oxygenated hydrocarbons from the Fischer-Tropsch reaction water to produce a primary water enriched stream;
  (b) a secondary treatment stage comprising liquid-liquid extraction for removing at least a fraction of organic acids from at least a portion of the primary water enriched stream to produce a secondary water enriched stream;
  (c) a tertiary treatment stage comprising biological treatment for removing at least a fraction of acidic oxygenated hydrocarbons from at least a portion of the secondary water enriched stream to produce a tertiary water enriched stream; and
  (d) a quartic treatment stage comprising solid-liquid separation for removing at least some solids from at least a portion of the tertiary water enriched stream.

The term "purified water" is to be interpreted as meaning an aqueous stream having a COD of between 20 and 500 mg/l, a pH of between 6.0 and 9.0, a suspended solids content of less than 250 mg/l and a total dissolved solids content of less than 600 mg/l.

The non-acid oxygenated hydrocarbons are typically selected from the group including: alcohols, ketones, and aldehydes, and are more specifically selected from the group including: acetaldehyde, propionaldehyde, butyraldehyde, acetone, methyl propyl ketone, methanol, ethanol, propanol, butanol, pentanol, hexanol, and heptanol.

The acidic oxygenated hydrocarbons are typically selected from the group including: formic acid, acetic acid, propionic aid, butyric acid, valeric acid, hexanoic acid, heptanoic acid, and octanoic acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g., acetic acid, propionic acid) and optionally trace quantities of non-acid compounds. As a result of the presence of organic acids, Fischer-Tropsch reaction water that has undergone primary treatment (primary water enriched stream) is known as Fischer-Tropsch acid water.

The overheads from distillation may be recovered and worked-up to products, or may be used for fuel or as an energy source.

The primary treatment stage may include degassing of the Fischer-Tropsch reaction water before further processing to remove compounds having a very low boiling point and dissolved gases from the Fischer-Tropsch reaction water.

Typically, Fischer-Tropsch reaction water originating from HTFT iron catalyst processes which water has undergone primary treatment has limited application due to the relatively high concentrations (>1% by mass) of organic acids remaining in the Fischer-Tropsch acid water, and further treatment of the water is required. In contrast, Fischer-Tropsch reaction water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This primary water enriched stream may also have limited application as process water.

The liquid-liquid extraction technique used during the secondary treatment stage may be differential contacting or stagewise contacting.

The differential contacting technique may include using equipment selected from the group including: spray columns, packed columns, rotating disc contactors and Da Laval contactors, or equivalent contactors.

The stagewise contacting technique may include using equipment selected from the group including: mixer settlers, perforated plate columns and controlled cycling columns.

The solvent used during step b) may be selected from a group of water insoluble solvents having an affinity for acids, said group including: alkyl ethers, ethyl acetate, alkyl phosphene oxides, and alkyl amides.

Step b) typically yields an organic acid enriched extract stream and a water enriched raffinate stream or secondary water enriched stream. A mixed hydrocarbon or interface stream containing C4+ hydrocarbons, solvent and Fischer-Tropsch acid water may also be generated. This hydrocarbon stream can be incinerated, send to biological treatment or worked-up to recover the heavier acids.

The extract stream may be refined and/or worked-up to recover the solvent. Conventional distillation is typically used for solvent recovery. The solvent thus obtained may be recycled to step b) or it may be combined with suitable streams produced during the Fischer-Tropsch process and sold as a product.

The secondary water enriched stream is then subjected to biological treatment in step c).

The biological treatment may include anaerobic treatment or aerobic treatment or a combination of aerobic or anaerobic treatment.

The anaerobic and/or aerobic treatment methods may be the same as are conventionally used for domestic and industrial wastewater treatment.

Alternatively, biological treatment may include anaerobic treatment followed by aerobic treatment.

The anaerobic and/or aerobic treatment methods may be the same as are conventionally used for domestic and industrial wastewater treatment.

The anaerobic and/or aerobic treatment may include adding nutrients in the form of nitrogen (e.g., urea, ammonia or ammonium salts) and phosphorus (e.g., phosphate salts) containing compounds to accelerate microbiological degradation of the organic constituents. In addition, pH control using alkali salts such as lime, caustic and soda ash may be required due to the acidity of the water.

Secondary water enriched streams originating from both HTFT and LTFT processes lend themselves to anaerobic digestion since they contain mainly readily digestible short-chain mono-carboxylic acids such as acetic, propionic, butyric, valeric acids, hexanoic acid, heptanoic acid and octanoic acid. Anaerobic technologies that have been successfully evaluated include Up-flow Anaerobic Sludge Blanket (UASB) processes, Fixed Bed systems, Fluidized Bed reactors, Stirred Tank reactors and Baffled reactors.

Anaerobic digestion typically yields methane, carbon dioxide and sludge as products along with a water enriched stream.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertilizer or soil conditioner.

A wide range of technologies may be used in the aerobic treatment of the secondary water enriched stream. Such technologies may be selected from group including: Activated Sludge processes, High-rate Compact Reactors, Biological Aerated Filters, Trickling filters, Rotating Biological Contactors, Membrane Bioreactors, and Fluidized Bed reactors. The aerobic production of Single Cell Protein (SCP) has also been successfully developed.

Apart from a tertiary water enriched stream, aerobic treatment typically yields carbon dioxide and sludge as byproducts. The carbon dioxide may be released to the environment. The sludge may be incinerated, used as land fill, fertilizer, soil conditioner or as a source of SCP.

Removal of the majority of the organic material from secondary water enriched streams originating from LTFT processes may be undertaken in a single biological treatment step.

Removal of the majority of the organic material from secondary water enriched streams originating from HTFT processes may require a bulk organic carbon removal step (anaerobic digestion) followed by a second biological polishing step (aerobic oxidation) to remove residual organic material.

The quartic treatment stage may be aimed at removing suspended solids from the tertiary water-enriched stream produced during biological treatment.

Suspended solid removal may be achieved by methods selected from the group including: sand filtration, membrane separation (e.g., micro- or ultrafiltration), sedimentation (with or without the use of flocculants), dissolved air flotation (with or without the use of flocculants) and centrifugation.

Local discharge standards or the intended application will dictate the required level and type of tertiary treatment.

Applications for the purified water produced by the method described above may include its use as cooling water, irrigation water or general process water.

The purified water typically has the following characteristics:

| Property | | |
|---|---|---|
| Chemical Oxygen Demand (COD) | mg/l | 20–500 |
| pH | | 6.0–9.0 |
| Suspended Solids (SS) | mg/l | <250 |
| Total Dissolved Solids (TDS) | mg/l | <600 |

The Fischer-Tropsch reaction which generates the Fischer-Tropsch reaction water may also produce other Fischer-Tropsch products. These Fischer-Tropsch products may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

According to a second aspect of the invention there is provided a process for the production of highly purified water from Fischer-Tropsch reaction water, which process includes at least the steps of:

(a) a primary treatment stage comprising an equilibrium staged separation process for removing at least a fraction of non-acid oxygenated hydrocarbons from the Fischer-Tropsch reaction water to produce a primary water enriched stream;

(b) a secondary treatment stage comprising liquid-liquid extraction for removing at least a fraction of organic acids from at least a portion of the primary water enriched stream to produce a secondary water enriched stream;

(c) a tertiary treatment stage comprising biological treatment for removing at least a fraction of acidic oxygenated hydrocarbons from at least a portion of the secondary water enriched stream to produce a tertiary treated water enriched stream; and (d) a final treatment stage comprising a dissolved salt and organic removal stage for removing at least some dissolved salts and organic constituents from at least a portion of the tertiary water enriched stream.

The process may furthermore include a quartic treatment stage comprising solid-liquid separation for removing at least some solids from at least a portion of the tertiary water enriched stream to produce a quartic water enriched stream which may then be subjected to final treatment.

The term "highly purified water" is to be interpreted as meaning an aqueous stream having a COD of less than 50 mg/l, a pH of between 6.0 and 9.0, a suspended solids content of less than 50 mg/l and a total dissolved solids content of less than 100 mg/l.

The non-acid oxygenated hydrocarbons are typically selected from the group including: alcohols, aldehydes, and ketones, are more specifically selected from the group including: acetaldehyde, propionaldehyde, butyraldehyde, acetone, methyl propyl ketone, methanol, ethanol, propanol, butanol, pentanol, hexanol, and heptanol.

The acidic oxygenated hydrocarbons are typically selected from the group including: formic acid, acetic acid, propionic aid, butyric acid, valeric acid, hexanoic acid, heptanoic acid, and octanoic acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g., acetic acid, propionic acid) and optionally trace quantities of non-acid compounds. As a result of the presence of organic acids, Fischer-Tropsch reaction water that has undergone primary treatment is known as Fischer-Tropsch acid water.

The overheads from distillation may be recovered and worked-up to products, or may be used for fuel or as an energy source.

The primary treatment stage may include degassing of the Fischer-Tropsch reaction water before further processing to remove compounds having a very low boiling point and dissolved gases from the Fischer-Tropsch reaction water.

Typically, Fischer-Tropsch acid water originating from HTFT iron catalyst processes which water has undergone primary treatment has limited application due to the relatively high concentrations (>1% by mass) of organic acids remaining in the Fischer-Tropsch acid water and further treatment of the water is required. In contrast, Fischer-Tropsch acid water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This primary water enriched stream may also have limited application as process water.

The liquid-liquid extraction technique used during the secondary treatment stage may be differential contacting or stagewise contacting.

The differential contacting technique may include using equipment selected from the group including: spray columns, packed columns, rotating disc contactors and Da Laval contactors and equivalents thereof.

The stagewise contacting technique may include using equipment selected from the group including: mixer settlers, perforated plate columns and controlled cycling columns.

The solvent used during step b) may be selected from a group of water insoluble solvents having an affinity for acids, said group including ethers, acetates, amides, and phosphene oxides, and more specifically from the group including: alkyl ethers, ethyl acetate, alkyl phosphene oxides, and alkyl amides.

Step b) typically yields an organic acid enriched extract stream and a water enriched raffinate stream or secondary water enriched stream. A mixed hydrocarbon stream containing C4+ hydrocarbons, solvent and Fischer Tropsch acid water may also be generated. This hydrocarbon stream can be incinerated, send to biological treatment or worked-up to recover the heavier acids.

The extract stream may be refined and/or worked-up to recover the solvent. Conventional distillation is typically used for solvent recovery. Alternatively, the solvent thus obtained may be recycled to step b) or it may be combined with suitable streams produced during the Fischer-Tropsch process.

The secondary water enriched stream obtained in step b) is then subjected to biological treatment in step c).

The biological treatment may include anaerobic treatment or aerobic treatment.

Alternatively, biological treatment may include anaerobic treatment followed by aerobic treatment.

The anaerobic and/or aerobic treatment methods may be the same as are conventionally used for domestic and industrial wastewater treatment.

The anaerobic and/or aerobic treatment may include adding nutrients in the form of nitrogen (e.g., urea, ammonia or ammonium salts) and phosphorus (e.g., phosphate salts) containing compounds to accelerate microbiological degradation of the organic constituents. In addition, pH control using alkali salts such as lime, caustic and soda ash may be required due to the acidity of the water.

Secondary water enriched streams originating from both HTFT and LTFT processes lend themselves to anaerobic digestion since they contain mainly readily digestible short-chain mono-carboxylic acids such as acetic, propionic, butyric, valeric acids, hexanoic acid, heptanoic acid and octanoic acid. Anaerobic technologies that have been successfully evaluated include Up-flow Anaerobic Sludge Blanket (UASB) processes, Fixed Bed systems, Fluidized Bed reactors, Stirred Tank reactors, Membrane Bioreactors, and Baffled reactors.

Anaerobic digestion typically yields methane, carbon dioxide and sludge as products along with a tertiary water enriched stream.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertilizer or soil conditioner.

A wide range of technologies may be used in the aerobic treatment of the raffinate stream produced during from step b). Such technologies may be selected from group including: Activated Sludge processes, High-rate Compact Reactors, Biological Aerated Filters, Trickling filters, Rotating Biological Contacters, Membrane Bioreactors, and Fluidized Bed reactors. The aerobic production of Single Cell Protein (SCP) has also been successfully developed.

Apart from a tertiary water enriched stream, aerobic treatment typically yields carbon dioxide and sludge as byproducts. The carbon dioxide may be released to the environment. The sludge may be incinerated, used as land fill, fertilizer, soil conditioner or as a source of SCP.

Removal of the majority of the organic material from secondary water enriched streams originating from LTFT processes may be undertaken in a single biological treatment step.

Removal of the majority of the organic material from secondary water enriched streams originating from HTFT processes may require a bulk organic carbon removal step (anaerobic digestion) followed by a second biological polishing step (aerobic oxidation) to remove residual organic material.

The quartic treatment stage may be aimed at removing suspended solids from the tertiary water-enriched stream produced during biological treatment.

Suspended solid removal may be achieved by methods selected from the group including: sand filtration, membrane separation (e.g., micro- or ultrafiltration), sedimentation (with or without the use of flocculants), dissolved air flotation (with or without the use of flocculants) and centrifugation.

Residual organic species not removed during biological treatment and solids removal may be removed by methods selected from the group including: chemical oxidation using agents such as ozone and hydrogen peroxide, ultraviolet light generated free radicals and adsorption/absorption processes including activated carbon treatment and organic scavenging resins.

Dissolved salts, originating from tertiary treatment (i.e., pH control chemicals, nutrient addition) and/or from the co-treatment of other process effluents, can be further reduced by methods from the group including: ion exchange, reverse osmosis, nano-filtration and chemical precipitation processes including hot and cold lime softening.

Typical uses for the highly purified water, over and above those mentioned for purified water, typically include drinking water and boiler feed water.

The highly purified water typically has the following characteristics:

| Property | | |
|---|---|---|
| Chemical Oxygen Demand (COD) | mg/l | <50 |
| PH | | 6.0–9.0 |
| Suspended solids (SS) | | <50 |
| Total Dissolved Solids (TDS) | mg/l | <100 |

Advantages inherent in the purified and highly purified water produced according to the present invention are that the water will contain only a small amount of dissolved solids because the Fischer-Tropsch reaction water is essentially a dissolved solids-free stream. The low levels of residual salts in the purified water are a result of controlled addition of chemicals used during the purification process sequence and/or the co-treatment of other dissolved solids containing effluents. The residual salts could include Ca, Mg, Na, K, Cl, $SO_4$, $HCO_3$ and $CO_3$ combinations. The low dissolved solids concentrations in Fischer-Tropsch reaction water can simplify and reduce the costs of the purification process.

The Fischer-Tropsch reaction which generates the Fischer-Tropsch reaction water may also produce other Fischer-Tropsch products. These Fischer-Tropsch products may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

DESCRIPTION OF THE DRAWING

The invention will now be described by way of the following non-limiting examples with reference to the accompanying drawing.

DETAILED DESCRIPTION OF THE INVENTION

Figure 1:
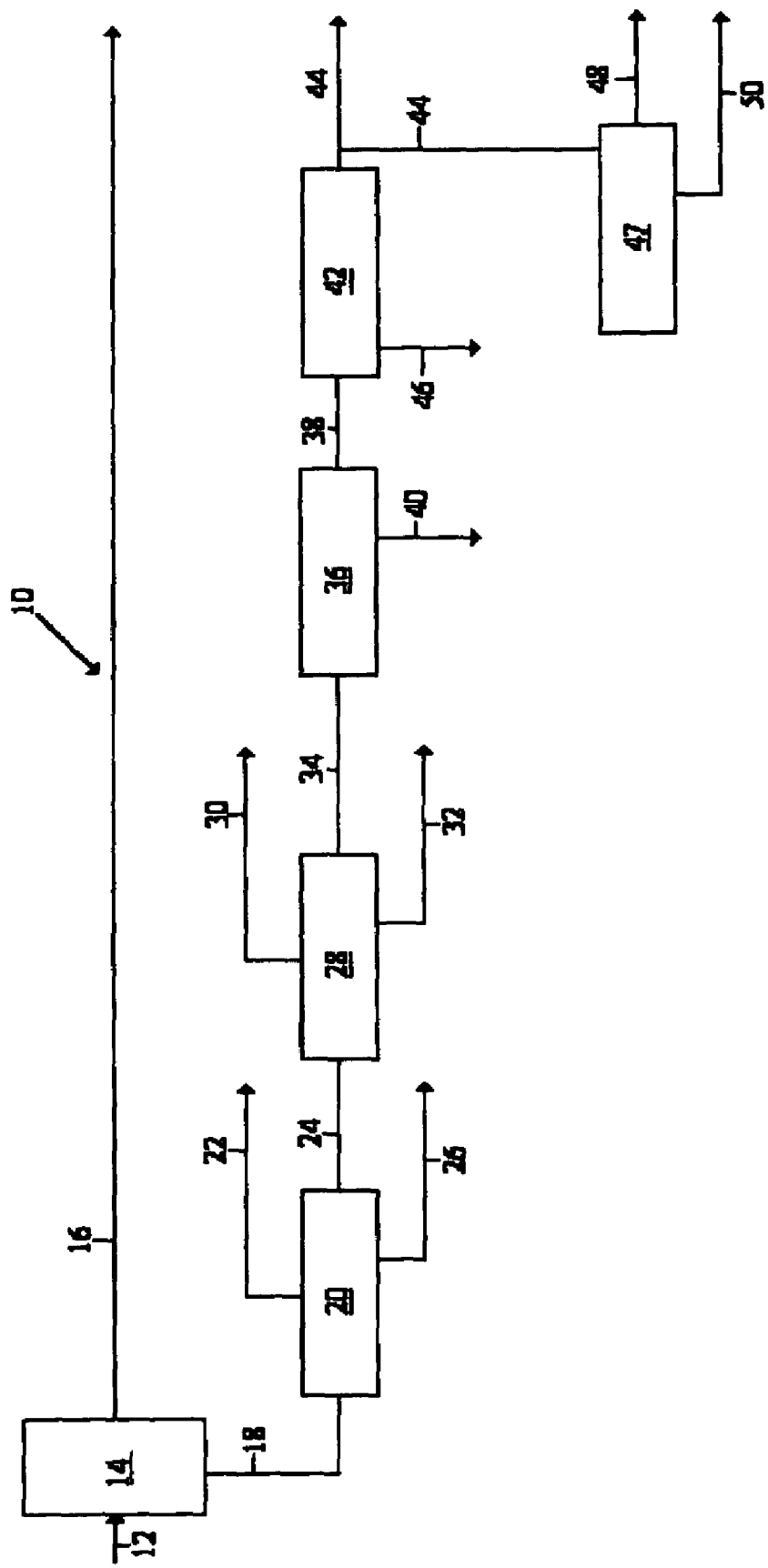
FIG. 1 shows a simplified block diagram of a method according to the present invention including various treatment options.

The Fischer-Tropsch reaction water 12 is fed to a distillation column 14 for primary treatment.

Two streams 16 and 18 exit distillation column 14. Stream 16 contains predominantly organic constituents whilst stream 18 is a primary water enriched stream.

At least a fraction of the organic acids in stream 18 are thereafter removed by liquid-liquid separation 20.

Liquid-liquid separation 20 yields an organic acid enriched extract stream 22, a secondary water enriched or raffinate stream 24 and a mixed hydrocarbon stream.

The secondary water enriched stream is subjected to biological treatment 28 which yields gases 30, sludge 32 and a tertiary water enriched stream 34. Biological treatment can take the form of anaerobic treatment or aerobic treatment or a combination of the two.

The tertiary water enriched stream 34 from biological treatment 28 is typically subjected to a softening step 36 which yields a softened tertiary water enriched stream 38 and sludge 40.

The softened tertiary water enriched stream 38 is subjected to solid-liquid separation 42 which process yields a purified water stream 44 and a sludge stream 46.

An additional step, typically membrane separation 47, for removing at least a fraction of dissolved salt and organic constituents contained in the purified water stream 44 can be performed after solid-liquid separation 42 to produce a stream of highly purified water 48 and sludge stream 50.

Depending on the final intended use of the purified 44 or highly purified water 48, the minimum water quality requirements are as set out in Table 2 below and the operating conditions of the equipment used in the method as well as suitable treatment options can be selected accordingly.

TABLE 2

Water Quality - Typical Requirements

| | Process Water | Irrigation water | Cooling water | Boiler feed water | Drinking water |
|---|---|---|---|---|---|
| COD mg/l | 0–75 | | 0–30 | 0–10 | |
| pH | 5–10 | 6.5–8.4 | 6.5–8 | 7–8 | 6–9 |
| TDS mg/l | 0–1600 | <40 | 0–450 | 0–100 | 0–450 |
| SS mg/l | 0–25 | 0–50 | 0–5 | 0–3 | <20 |

Having described the basic aspects of the invention, the following example is given to further illustrate specific embodiments thereof.

Example: Recovery of Acetic acid via liquid-liquid extraction from Fischer-Tropsch reaction water derived from an HTFT process in which an iron catalyst was used and subsequent effluent treatment After separation of by-products, a water enriched stream from an HTFT Fischer-Tropsch process was degassed at atmospheric pressure in an open vessel. Free hydrocarbons in the water enriched stream were reduced to 0.01% (mass %) using a coalescer. The composition of the Fischer-Tropsch reaction water thus obtained is given in Table 3 below.

Table 3: Typical Composition of HTFT Reaction Water Feed and Acid Water Bottoms (water enriched stream) after Primary Treatment (Distillation)

| Component | Reaction water feed to primary distillation column (mass %) | Acid water - bottoms of primary distillation column (mass %) |
|---|---|---|
| Water | 94.00 | 98.799 |
| Total NAC | 4.80 | 0.001 |
| Total Acids | 1.20 | 1.20 |
| Hydrocarbons | 0.01 | <0.01 |
| COD (mg/l) | 78000 | 16000 |

Primary treatment of the Fischer-Tropsch reaction water was effected using distillation. Analysis of the Fischer-Tropsch acid water bottoms from the distillation column is detailed in Table 3 above.

It is evident from this analysis mainly non-acid components are removed during primary distillation leaving an organic acid enriched stream containing 1.2% organic acids comprising predominantly acetic acid. The measured COD of this stream was in the order of 16000 mg $O_2$/l.

The primary water enriched stream was cooled to 50° C. and fed into a counter current packed extractor column in which the primary water enriched stream came into contact with an Alkyl Ether, namely MTBE, as organic solvent.

The extract exited the top of the extractor column with the extracted acids and some water, while the secondary water enriched stream exited the extractor bottom with a significantly lower acid content than the primary water enriched stream that entered the extractor column and some dissolved solvent.

The extractor column was operated at 440 kPa and 53° C. with an acetic acid recovery rate of 55%. The recovery of the higher acids (e.g., propionic acid, butyric acid, valeric acid) ranged from 97% to more than 99.9%.

The solvent was recovered from the extract in two distillation steps, which were configured similarly to a double effect evaporator. The first distillation (at 274 kPa and 96° C.) operated as an evaporator with some vapor washing.

In the second distillation step which took place at a pressure of 60 kPa and a temperature of 141° C., a large amount of the remaining solvent was recovered and the acids were dried.

The mixed acid stream exiting the second distillation column was fed to a purification section. The lean solvent was recycled to the extractor column and the secondary water enriched stream was recycled to a raffinate stripper. The solvent contained in the secondary water enriched stream as well as the solvent from the extractor and solvent recovery section was recovered in a packed stripper column operated at a pressure of at 42 kPa and a temperature of 106° C. and recycled. The water bottom product from the stripper (secondary water enriched stream) was fed to a biological treatment section.

In the purification section the heavier acids ($C_4+$) were removed from the bottom stream of the second distillation column in the solvent recovery section along with the other heavy impurities as a bottom stream from a distillation column operated at a pressure of 57 kPa and a temperature of 179° C.

This mixed hydrocarbon stream was sent to effluent disposal. The top stream from the distillation column containing acetic acid, propionic acid and lighter hydrocarbons was fed to the next distillation column operated at 62 kPa and 154° C.

Here the propionic acid product of minimum mass 99.5% purity was recovered as a vapor side-draw from the bottom of the column and then condensed. The liquid overhead stream from the column was fed to a distillation column operated at a pressure of 42 kPa and a temperature of 130° C. where the acetic acid was dried.

The overhead stream containing light impurities, water and some acetic acid can, for example, be used as fuel for thermal oxidation. The acetic acid bottom stream from the distillation column was further purified by removing impurities capable of being oxidized by treating the stream with $KMnO_4$. The treated stream was returned to the same column. As a result of this oxidation step, some heavy acids were formed which were removed in a distillation column as a bottom stream. Acetic acid product having a minimum of 99.85% (by mass) purity was recovered as a vapor side draw and condensed.

The first stage of the biological section comprised an open equalization tank with a HRT of 8–12 h.

The secondary water enriched stream obtained from the extraction step was fed to a Down-flow Packed Bed (DPB) anaerobic digester containing plastic packing material. Caustic soda (NaOH) was dosed into the feed in order to adjust the pH from pH 3 to pH 4.5. Nutrients were also added to sustain the process.

The DPB anaerobic digester was operated under the following conditions:
Temperature: 35 to 38° C.
pH: 6.8 to 7.0
HRT: 20–25 h
COD loading rate: 5–8 kg $O_2/m^3$.d
Feed to recycle ratio: 1:4

The COD and SS concentrations of the effluent after anaerobic digestion were ca. 600 mg $O_2$/l and ca. 500 mg SS/l, respectively. The COD removal across the reactor was on average 90%.

In order to further reduce the organic content and COD, tertiary water enriched stream obtained from anaerobic treatment was further subjected to aerobic treatment in an activated sludge basin.

Additional nutrient and caustic soda dosing was not necessary and activated sludge treatment was conducted under the following conditions:
pH: 7.2 to 7.5
Dissolved oxygen concentration in basin: ±2 mg/l
Temperature: 33 to 35° C.
HRT: 28–32 h
F/M ratio: ±0.35 kg COD/kg MLSS
Cell retention time (sludge age): 15 days
Feed to recycle ratio: 1:2.5

A sludge yield of 0.15 kg sludge/kg COD was achieved and the sludge produced was incinerated. The tertiary water enriched stream obtained from aerobic treatment contained COD and SS concentrations of 100 mg $O_2$/l and 70 mg SS/l, respectively.

Sand filtration was used to reduce the SS concentration of the tertiary water enriched stream obtained from aerobic treatment to 30 mg/l.

During sand filtration, the COD concentration of the tertiary water enriched stream obtained from aerobic treatment was further reduced to ca. 55 mg/l. This water has application as process cooling water.

In order to obtain highly purified water, a portion of the purified water from the sand filter was diverted to a cross-flow membrane unit fitted with a 0.2 μm polypropylene microfiltration membrane. A permeate flux rate of 70–80 l/$m^2$.h was obtained during stable operation of the unit, and the water recovery across the unit varied between 75–85%. The resultant SS and COD concentrations in the permeate from the microfiltration unit were <5 SS mg/l and 580 mg $O_2$/l, respectively.

The pH of the purified water from the microfiltration unit was then adjusted to pH 8.5 using sodium hydroxide, and the purified water was pumped to a reverse osmosis unit fitted with a high rejection sea water polyamide membrane. A permeate flux rate of 20–25 l/$m^2$.h was obtained during stable operation of the unit, and the water recovery across the unit varied between 80–90%. The reverse osmosis unit yielded a highly purified water stream containing COD and TDS concentrations of <40 mg $O_2$/l and <20 mg TDS/l.

It is to be appreciated, that the invention is not limited to any specific embodiment or configuration as hereinbefore generally described or illustrated, for example, rain water or water enriched streams from processes other than Fischer-Tropsch synthesis may be purified according to the method described above.

What is claimed is:

1. A process for the production of purified water from Fischer-Tropsch reaction water containing oxygenated hydrocarbons, aliphatic, aromatic and cyclic hydrocarbons and inorganic compounds, wherein the purified water is an aqueous stream having a COD of between 20 and 500 mg/l, a pH of between 6.0 and 9.0, a suspended solids content of less than 250 mg/l and a total dissolved solids content of less than 600 mg/l, and wherein the process includes at least the steps of:
- a) a primary treatment stage comprising distillation for removing at least a fraction of non-acid oxygenated hydrocarbons from the Fischer-Tropsch reaction water to produce a primary water enriched stream;
- b) a secondary treatment stage comprising liquid-liquid extraction for removing at least a fraction of organic acids from at least a portion of the primary water enriched stream to produce a secondary water enriched stream;
- c) a tertiary treatment stage comprising biological treatment for removing at least a fraction of acidic oxygenated hydrocarbons from at least a portion of the secondary water enriched stream to produce a tertiary water enriched stream; and
- d) a quartic treatment stage comprising solid-liquid separation for removing at least some solids from at least a portion of the tertiary water enriched stream.

2. The process of claim 1, wherein the non-acid oxygenated hydrocarbons are selected from the group including: alcohols, aldehydes, and ketones and wherein the acidic oxygenated hydrocarbons are selected from the group including: formic acid, acetic acid, propionic aid, butyric acid, valeric acid, hexanoic acid, heptanoic acid, and octanoic acid.

3. The process of claim 1, wherein the primary treatment stage includes degassing of the Fischer-Tropsch reaction water before further processing in the primary treatment stage to remove compounds having a very low boiling point and dissolved gases from the Fischer-Tropsch reaction water.

4. The process of claim 1, wherein the liquid-liquid extraction technique used during the secondary treatment stage is either or both of:
differential contacting including using equipment selected from the group including:
spray columns, packed columns, rotating disc contactors, and Da Laval contactors or equivalent; and
stagewise contacting including using equipment selected from the group including:
mixer settlers, perforated plate columns, and controlled cycling columns.

5. The process of claim 1, wherein the solvent used during step b) is selected from a group of water insoluble solvents having an affinity for acids, said group including ethers, acetates, amides, and phosphene oxides.

6. The process of claim 1, wherein the biological treatment includes one or both of:
anaerobic treatment selected from the group including: Up-flow Anaerobic Sludge Blanket (UASB) processes, Fixed Bed systems, Fluidized Bed reactors, Stirred Tank reactors, Membrane Bioreactors and Baffled reactors; and
aerobic treatment selected from group including: Activated Sludge processes, Biological Aerated Filters, Trickling filters, Rotating Biological Contacters, High-rate Compact Reactors, Membrane Bioreactors, and Fluidized Bed reactors.

7. The process of claim 1, wherein the quartic treatment stage removes suspended solids from the tertiary water-enriched stream produced during biological treatment.

8. The process of claim 7, wherein the suspended solid removal is achieved by one or more method selected from the group including: sand filtration, membrane separation, sedimentation with the use of flocculants, sedimentation without the use of flocculants, dissolved air flotation with the use of flocculants, dissolved air flotation without the use of flocculants, and centrifugation.

9. The process of claim 8, wherein the membrane separation method includes one or both of microfiltration and ultrafiltration.

10. A process for the production of highly purified water from Fischer-Tropsch reaction water containing oxygenated hydrocarbons, aliphatic, aromatic and cyclic hydrocarbons and inorganic compounds, wherein the highly purified water is an aqueous stream having a COD of less than 50 mg/l, a pH of between 6.0 and 9.0, a suspended solids content of less than 50 mg/l and a total dissolved solids content of less than 100 mg/l, and wherein the process includes at least the steps of:
- a) a primary treatment stage comprising distillation for removing at least a fraction of non-acid oxygenated hydrocarbons from the Fischer-Tropsch reaction water to produce a primary water enriched stream;
- b) a secondary treatment stage comprising liquid-liquid extraction for removing at least a fraction of acidic oxygenated hydrocarbons from at least a portion of the primary water enriched stream to produce a secondary water enriched stream;
- c) a tertiary treatment stage comprising biological treatment for removing at least a fraction of acidic oxygenated hydrocarbons from at least a portion of the secondary water enriched stream to produce a tertiary treated water enriched stream; and
- d) a final treatment stage comprising a dissolved salt and organic removal stage for removing at least some dissolved salts and organic constituents from at least a portion of the tertiary water enriched stream.

11. The process of claim 10, wherein the process includes a quartic treatment stage comprising solid-liquid separation for removing at least some solids from at least a portion of the tertiary water enriched stream to produce a quartic water enriched stream which is then be subjected to final treatment.

12. The process of claim 10, wherein the non-acid oxygenated hydrocarbons are selected from the group including: alcohols, aldehydes, and ketones and wherein the acidic oxygenated hydrocarbons are selected from the group including: formic acid, acetic acid, propionic aid, butyric acid, valeric acid, hexanoic acid, heptanoic acid, and octanoic acid.

13. The process of claim 10, wherein the primary treatment stage includes degassing of the Fischer-Tropsch reaction water before further processing in the primary treatment stage to remove compounds having a very low boiling point and dissolved gases from the Fischer-Tropsch reaction water.

14. The process of claim 10, wherein the liquid-liquid extraction technique used during the secondary treatment stage is either or both of:
differential contacting including using equipment selected from the group including: spray columns, packed columns, rotating disc contactors, and Da Laval contactors or equivalent; and
stagewise contacting including using equipment selected from the group including:
mixer settlers, perforated plate columns, and controlled cycling columns.

15. The process of claim 10, wherein the solvent used during step b) is selected from a group of water insoluble solvents having an affinity for acids, said group including ethers, acetates, amides, and phosphene oxides.

16. The process of claim 10, wherein the biological treatment includes one or both of:

anaerobic treatment selected from the group including: Up-flow Anaerobic Sludge Blanket (UASB) processes, Fixed Bed systems, Fluidized Bed reactors, Stirred Tank reactors, Membrane Bioreactors, and Baffled reactors; and aerobic treatment selected from group including: Activated Sludge processes, Biological Aerated Filters, Trickling filters, Rotating Biological Contactors, High-rate Compact Reactors, Membrane Bioreactors and Fluidized Bed reactors.

17. The process of claim 10, having a quartic treatment stage that removes suspended solids from the tertiary water-enriched stream produced during biological treatment by one or more method selected from the group including:

sand filtration, membrane separation, sedimentation with the use of flocculants, sedimentation without the use of flocculants, dissolved air flotation with the use of flocculants, dissolved air flotation without the use of flocculants, and centrifugation.

18. The process of claim 17, wherein the membrane separation method includes one or both of microfiltration and ultrafiltration.

19. The process of claim 10, wherein residual organic species are removed in the final treatment stage by one or more method selected from the group including: chemical oxidation, ultraviolet light generated free radicals, adsorption and/or absorption processes.

20. The process of claim 10, wherein dissolved salts originating from secondary treatment and/or from the co-treatment of other process effluents, are reduced in the final treatment stage by one or more method selected from the group including: ion exchange, reverse osmosis, nano-filtration, and chemical precipitation processes.

* * * * *

UNITED STATES PATENT AND TRADEMARK OFFICE
CERTIFICATE OF CORRECTION

PATENT NO. : 7,150,831 B2 Page 1 of 1
APPLICATION NO. : 11/014517
DATED : December 19, 2006
INVENTOR(S) : Luis P. F. Dancuart Kohler et al.

It is certified that error appears in the above-identified patent and that said Letters Patent is hereby corrected as shown below:

In the specification:
COLUMN 3, LINE 40, change "propionic aid," to --propionic acid,--
COLUMN 4, LINE 30, change "send" to --sent--
COLUMN 6, LINE 45, change "propionic aid," to --propionic acid,--
COLUMN 7, LINE 37, change "send" to --sent--
COLUMN 9, LINE 57, change "hydrocarbon stream." to --hydrocarbon stream 26.--

In the claims:
CLAIM 2, COLUMN 13, LINE 26, change "propionic aid," to --propionic acid,--
CLAIM 12, COLUMN 14, LINE 45, change "propionic aid," to --propionic acid,--

Signed and Sealed this

Sixteenth Day of December, 2008

JON W. DUDAS
*Director of the United States Patent and Trademark Office*